(12) United States Patent
Kwon

(10) Patent No.: US 6,346,696 B1
(45) Date of Patent: Feb. 12, 2002

(54) IMAGE SENSOR AND METHOD FOR DRIVING THE SAME

(75) Inventor: Oh-Bong Kwon, Ichon-shi (KR)

(73) Assignee: Hyundai Electronics Industries Co., Ltd., Ichon (JP)

(*) Notice: Subject to any disclaimer, the term of this patent is extended or adjusted under 35 U.S.C. 154(b) by 0 days.

(21) Appl. No.: 09/418,972

(22) Filed: Oct. 14, 1999

(30) Foreign Application Priority Data

Oct. 14, 1998 (KR) .............................................. 98-43058

(51) Int. Cl.[7] ........................... H04N 3/14; H04N 5/335
(52) U.S. Cl. ..................................... 250/208.1; 348/308
(58) Field of Search .......................... 250/208.1, 214 R, 250/214.1; 348/294, 300, 301, 302, 308

(56) References Cited

U.S. PATENT DOCUMENTS 5,962,844 A * 10/1999 Merrill et al. ........... 250/214 A
6,194,696 B1 * 2/2001 Fossum et al. .......... 250/208.1
6,291,810 B1 * 9/2001 Yokomichi et al. ...... 250/208.1

FOREIGN PATENT DOCUMENTS

EP 0825763 A2 2/1998 ............ H04N/3/15

* cited by examiner

*Primary Examiner*—John R. Lee
(74) *Attorney, Agent, or Firm*—Jacobson Holman, PLLC

(57) ABSTRACT

An image sensor and a method for driving a pixel array in the image sensor are to prevent unnecessary power consumption by controlling transistors contained in a unit pixel. The unit pixel contains a transfer transistor, a reset transistor, a drive transistor and a select transistor. Under a correlated double sampling, within a predetermined period after the reset transistor is turned off, the select transistor is turned on to output a reset voltage level transferred from a voltage source as a unit pixel output signal through the drive transistor. As a result, the voltage source is not directly coupled to an output of the unit pixel to thereby effectively reduce unwanted power consumption and enhance the resulted picture quality.

18 Claims, 5 Drawing Sheets ature of the invention to
IMAGE SENSOR AND METHOD FOR DRIVING THE SAME

FIELD OF THE INVENTION

The present invention relates to an image sensor; and, more particularly, to an image sensor and a method for driving the image sensor, which is capable of reducing power consumption and improving a picture quality.

DESCRIPTION OF THE PRIOR ART

Generally, an image sensor is an apparatus to capture images using light sensing semiconductor materials. The image sensor includes a pixel array which contains a plurality of image sensing elements, e.g., photodiode and receives light from an object to generate an electric image signal.

Such an image sensor is disclosed in a copending commonly owned application, U.S. Ser. No. 09/305,756, entitled "CMOS IMAGE SENSOR HAVING COMMON OUTPUTTING TRANSISTORS AND METHOD FOR DRIVING THE SAME" filed on May 10, 1999, and has a control and system interface unit.

The control and system interface unit controls the image sensor by controlling an integration time, scan addresses, operation modes, a frame rate, a bank and a clock division, and serves as an interface with an external system.

A pixel array including MxN unit pixels, arranged in a matrix, senses images from an object. The image sensor generally employs a correlated double sampling (hereinafter, referred to as a CDS), to thereby obtain high picture quality under the control of the control and system interface. In order to implement the CDS, each of the unit pixels includes, e.g., a photodiode and four transistors, respectively. Also, the four transistors in the unit pixel include a transfer transistor, a reset transistor, a drive transistor and a select transistor. According to the CDS, the unit pixel outputs a reset voltage level as a unit pixel output signal from a voltage source by turning on the select transistor while the reset transistor is kept on a turned-on state under the control of the control and system interface unit. Also, the unit pixel provides a data voltage level as another unit pixel output signal from the photodiode by turning on and off the transfer transistor in a turned-off state of the reset transistor and reading out the photoelectric charges generated in the photodiode under the control of the control and system interface unit. As a result, an unexpected voltage in the unit pixel can be effectively removed and a net image data value can be obtained by using the reset voltage level and the data voltage level as unit pixel output signals.

Referring to FIG. 3, there is shown a timing chart showing the control scheme for the CDS.

The turned-on transfer transistor is turned off and kept on a turned-off state during a predetermined period in response to the transfer control signal Tx1, while the reset transistor and the select transistor are kept on the turned-on state and the turned-off state, respectively. As shown, the select transistor is turned on in response to a select control signal Sx1 while the reset transistor is kept on the turned-on state and the transfer transistor is kept on the turned-off state, so that a reset voltage level is outputted through the drive transistor and the select transistor as a unit pixel output signal.

However, in the this case, the reset transistor and the select transistor should be simultaneously turned on in order to output the reset voltage level through the drive transistor and the select transistor. At this time, a current path between the voltage source and a ground can be formed, so that a leakage current is unnecessarily flowed. Therefore, undesirable power consumption may be incurred by the leakage current.

Furthermore, as shown in FIG. 4, the power line 310 is arranged around the pixel array 300. The leakage current caused in the section "B2" may not affect unit pixels adjacent to the power line 310. However, in case of unit pixels disposed in the middle of the pixel array, i.e., a unit pixel 320, since the power consumption caused by the leakage current occurs, the lowered voltage level may be supplied to the unit pixel 320. Therefore, there may be a undesirable problem that a level of the image value to be outputted also is lowered to thereby degrade the total picture quality in the image sensor.

SUMMARY OF THE INVENTION

It is, therefore, an object of the present invention to provide a method for driving a pixel array, which is capable of improving a picture quality by reducing the unnecessary power consumption.

It is, therefore, another object of the present invention to provide an image sensor, which is capable of improving a picture quality by reducing the unnecessary power consumption.

In accordance with an aspect of the present invention, there is provided a method for driving a pixel array including a plurality of unit pixels in an image sensor, wherein each of the unit pixels has a light sensing means for receiving light from an object and for generating photoelectric charges, an amplification means for amplifying an input signal to output an amplified signal, a first switching means for transferring the photoelectric charges from the light sensing means as the input signal to the amplifying means, a second switching means for transferring a reset voltage level from a voltage source to the light sensing means and the amplification means, and a third switching means for outputting the amplified signal and the reset voltage level as unit pixel output signals, the method comprising the steps: a) controlling the first switching means, the second switching means and the third switching means to provide the reset voltage level to the light sensing means in order to make a fully depleted region in the light sensing means; b) after a first predetermined period from the completion of the step a), turning off the second switching means, while the first switching means and the third switching means are kept on the turned-off state; and c) within a second predetermined period from the completion of the step b), turning on the third switching means, while the first switching means and the second switching means are kept on the turned-off state, to thereby output the reset voltage level as a unit pixel output signal.

In accordance with another aspect of the present invention, there is provided an image sensor for converting an image into an electrical signal, comprising: a pixel array including a plurality of unit pixels, arranged in a matrix, wherein each of the unit pixels for generating an amplified signal corresponding to photoelectric charges and a reset voltage level as unit pixel output signals, each of the unit pixels including: a light sensing means for receiving light from an object and for generating photoelectric charges; an amplification means for amplifying an input signal to output the amplified signal and the reset voltage signal; a first switching means, in response to a first control signal, for transferring the photoelectric charges from the light sensing means as the input signal to the amplification means; a second switching means, in response to a second control signal, for transferring the reset voltage level from the voltage source to the light sensing means and the amplification means; and a third switching means, in response to a third control signal, for outputting the amplified signal and the reset voltage level as unit pixel output signals; and a control means for controlling the pixel array by generating the first, the second and the third control signals in accordance with a control mode, wherein the control mode includes a first unit pixel output control mode and, in the first unit pixel output control mode, the second switching means is turned off in response to the second control signal and the third switching means is turned on in response to the third control signal within a predetermined period after turning-off of the second switching means, while the first switching means is kept on a turned-off state, to thereby output the reset voltage level through the amplification means and the third switching means as an unit pixel output signal.

BRIEF DESCRIPTION OF THE DRAWINGS

Other objects and aspects of the invention will become apparent from the following description of the embodiments with reference to the accompanying drawings, in which.

DETAILED DESCRIPTION OF THE PREFERRED EMBODIMENTS

Figure 1:
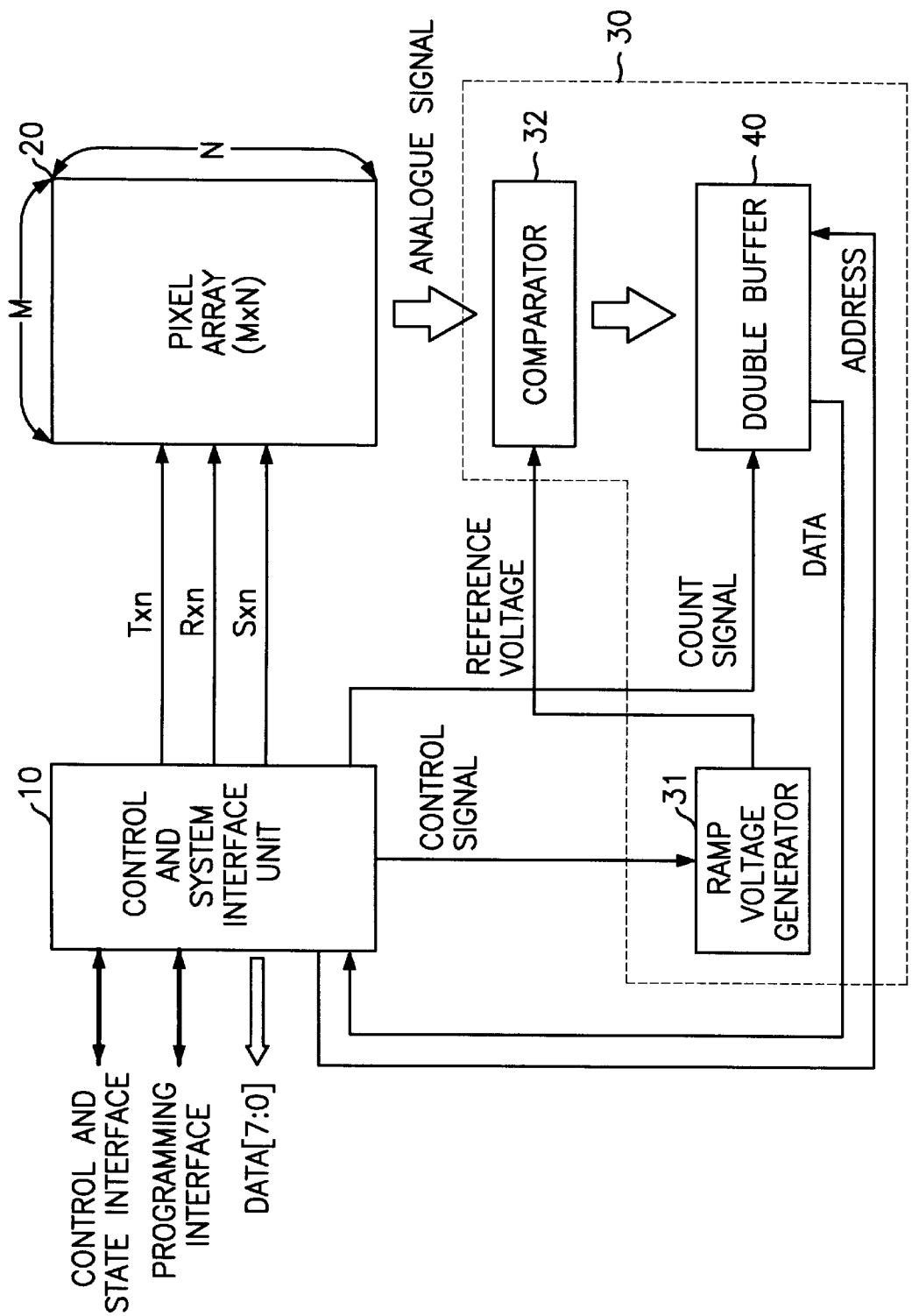
FIG. 1 is a block diagram showing an image sensor in accordance with the present invention.
Figure 2:
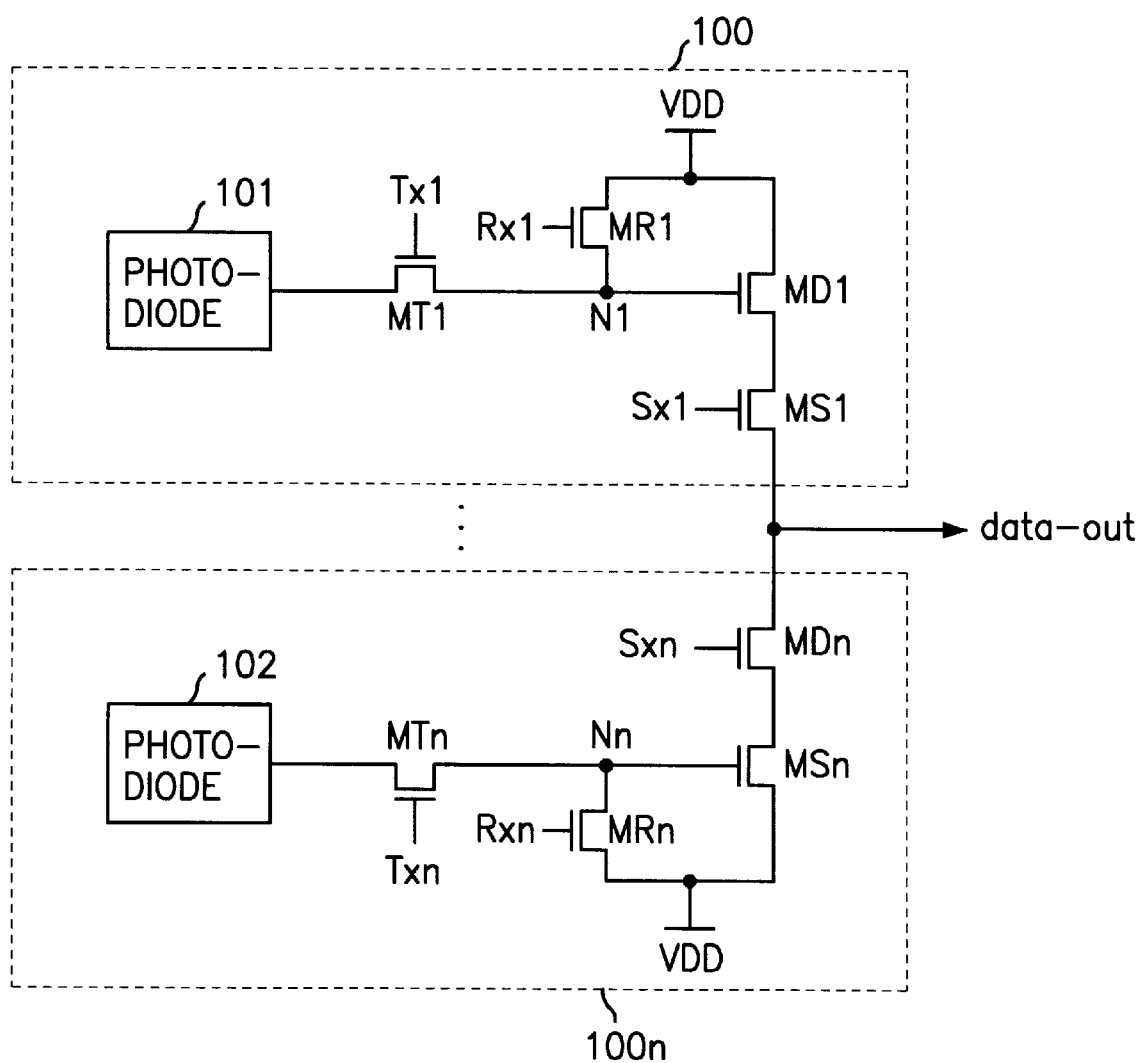
FIG. 2 is a schematic diagram describing a unit pixel contained in the image sensor shown in FIG. 1.
Figure 3:
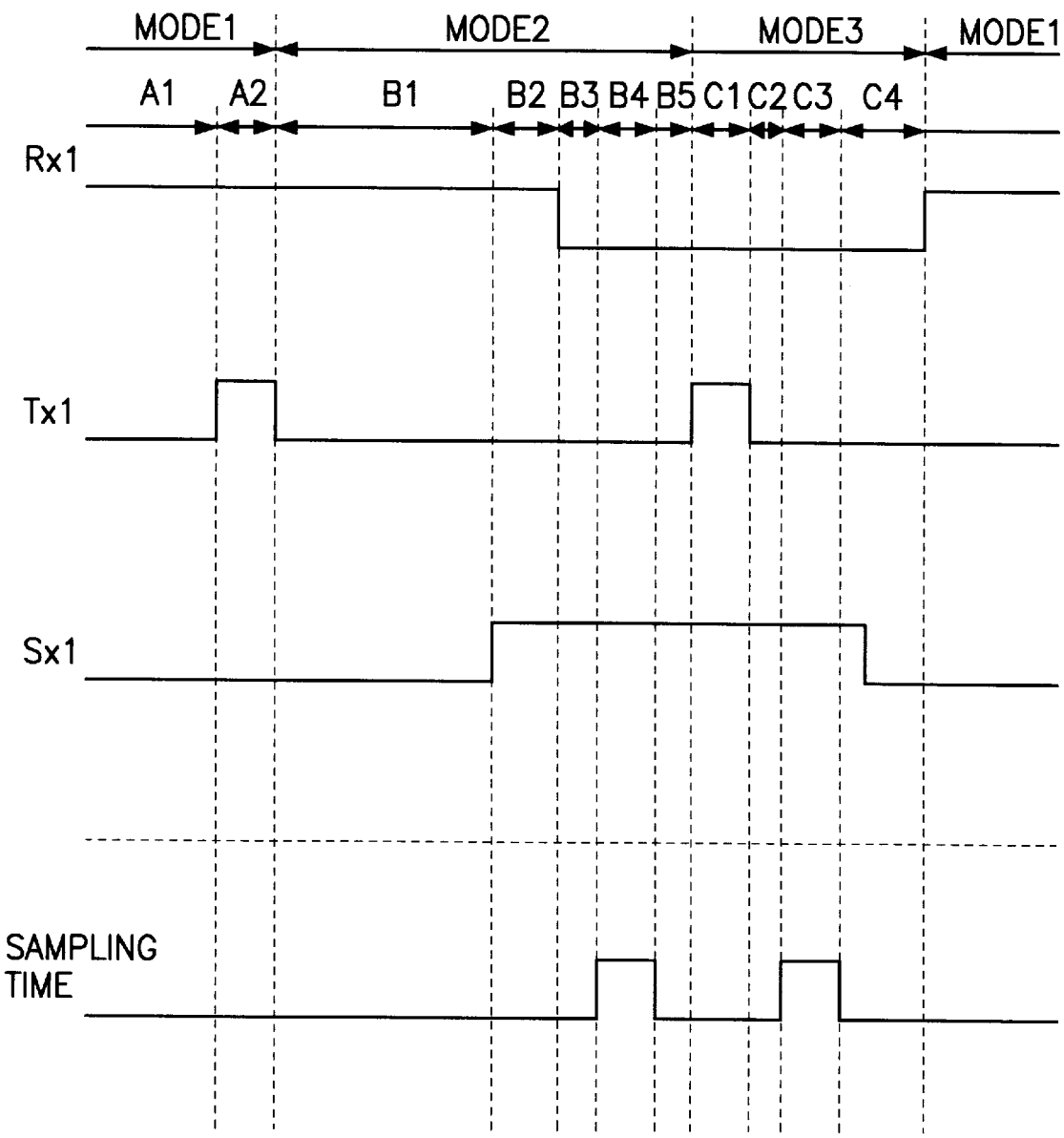
FIG. 3 is a timing chart depicting conventional control signals to control transistors of the unit pixel shown in FIG. 2.
Figure 4:
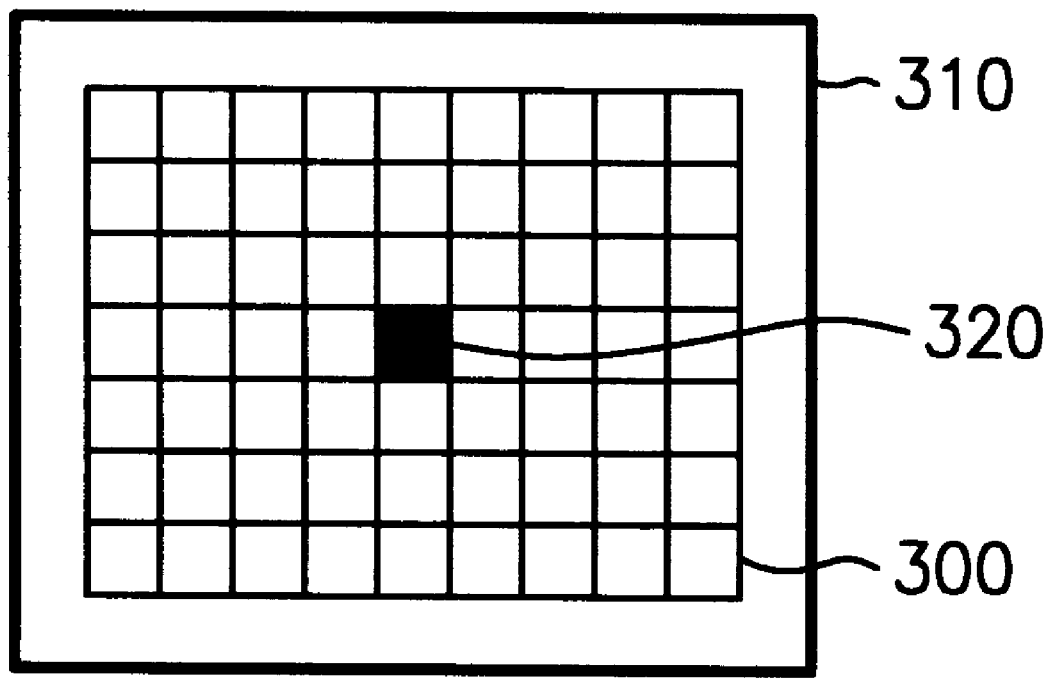
FIG. 4 is a diagram demonstrating an arrangement between a pixel array and a power line.

Referring to FIGS. 1 and 2, an image sensor includes a control and system interface unit 10, a pixel array 20 having a plurality of image sensing elements, and a single slope A/D converter 30. The single slope A/D converter 30 also includes a ramp voltage generator 31 for generating a reference voltage signal, a comparator (operational amplifier) 32 for comparing the ramp voltage signal with an analog signal from the pixel array 20, and a double buffer 40.

The control and system interface unit 10 controls the image sensor by controlling an integration time, scan addresses, operation modes, a frame rate, a bank and a clock division, and serves as an interface with an external system. The pixel array 20 including MxN unit pixels, arranged in a matrix, where M and N are positive integers. Each unit pixel has a light sensing element and senses images from an object. The single slope A/D converter 30 converts analog signals including unit pixel output signals from the pixel array 20 into digital signals. This A/D conversion is carried out by comparing the ramp voltage with the analog signals in response to a count signal. The converted digital value corresponding to the analog signal is stored in the double buffer 40 as digital data.

FIG. 2 is a schematic diagram illustrating a unit pixel constituting a pixel array. As shown in FIG. 2, the pixel array (20, in FIG. 1) includes a plurality of unit pixels arranged in a matrix. Each of the unit pixels 100 and 100n includes a photodiode as the light sensing element and four transistors, respectively. Also, the four transistors in the unit pixel 100 include a transfer transistor MT1 as a first switching means, a reset transistor MR1 as a second switching means, a drive transistor MD1 as a amplification means and a select transistor MS1 as a third switching means. The photodiode 101 receives light from an object and generates photoelectric charges. The transfer transistor MS1 transfers the photoelectric charges generated in the photodiode 101 to the drive transistor MD1 as an input signal through sensing node N1. The reset transistor MR1 transfers a reset voltage level from a voltage source VDD to the photodiode 101 and the drive transistor MD1 through the sensing node N1. The drive transistor MD1 acts as a source follower to amplify input signals from the photodiode 101 and the reset transistor MR1. The select transistor MS1 outputs the amplified signal or the reset voltage level as a unit pixel output signal. In accordance with an embodiment of the present invention, the four transistors MT1, MR1, MD1 and MS1 can be preferably implemented with NMOS transistors.

The image sensor according to the present invention is based on the correlated double sampling (CDS), thereby obtaining high picture quality.

Figure 5:
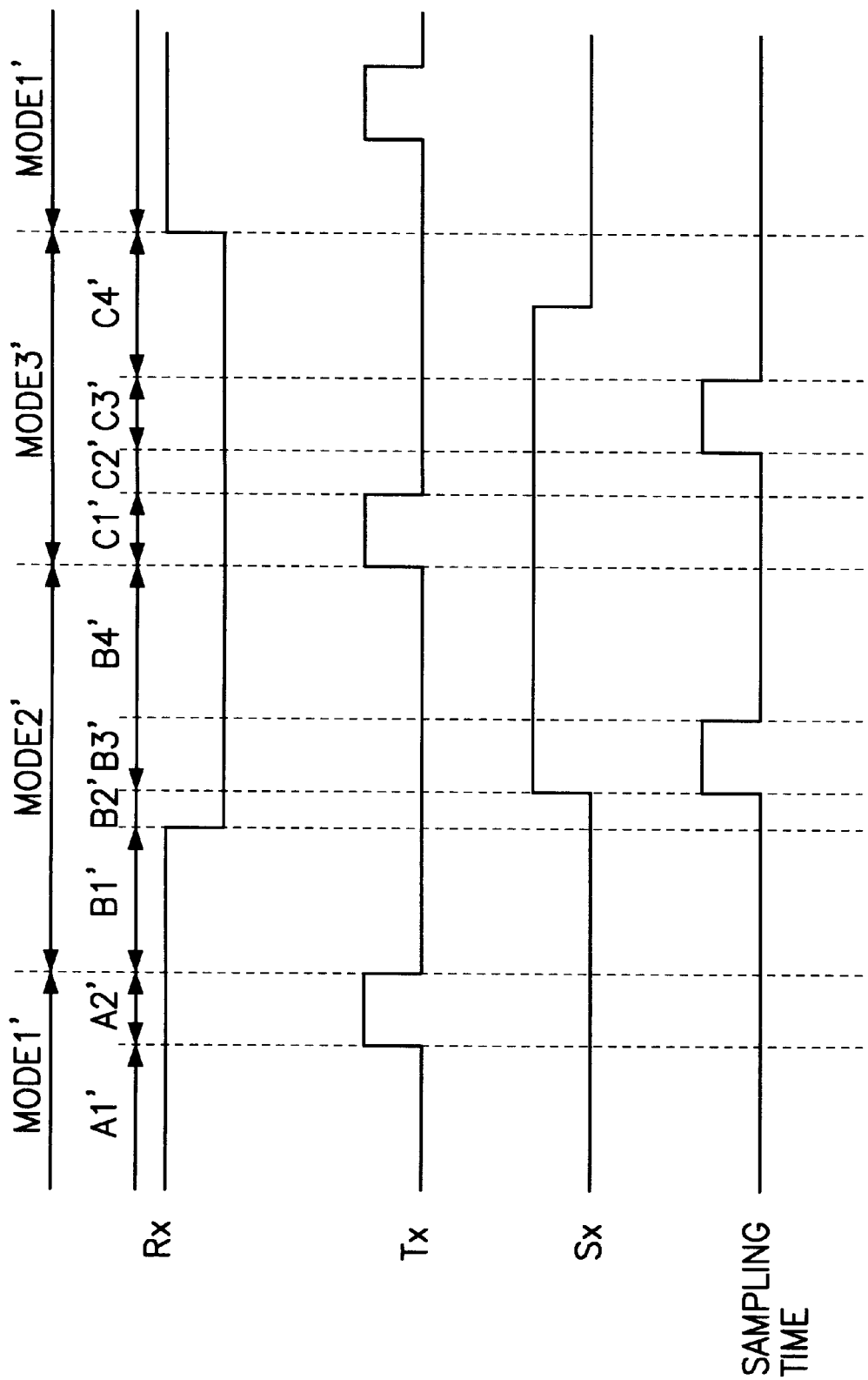
FIG. 5 is a timing chart illustrating control signals to control transistors of the unit pixel shown in FIG. 2 in accordance with the present invention.

FIG. 5 shows a timing chart illustrating control signals to control transistors contained in the unit pixel shown in FIG. 2 in accordance with the present invention. The operation of the unit pixel 100 will be described with reference to FIGS. 2 and 5.

In order to obtain the unit pixel output signals, there are three control modes according to the operation of the unit pixel, which include a reset control mode MODE1', a first unit pixel output mode MODE2' and a second unit pixel output mode MODE3'.

In the reset control mode MODE1', the transfer, the reset and the select transistors are controlled in order to obtain a fully depleted region in the photodiode 101 as follows:

a) In section "A1'", the reset transistor MR1 is turned on in response to a reset control signal Rx1 while the transfer and the select transistor transistors are kept on a turned-off state; and b) In section "A2'", the transfer transistor MT1 is turned on in response to a transfer control signal Tx1 during a predetermined period while the reset transistor MR1 and the select transistor MS1 are kept on a turned-on state and a turned-off state, respectively. Therefore, the voltage source is transferred through the transfer transistor MT1 to the photodiode 101, to thereby make a fully depleted region in the photodiode 101. This means that the operation of the photodiode 101 is reset.

On the other hand, in the first unit pixel output mode MODE2', when the transfer transistor MT1 is turned off, the photodiode 101 receives light from an object and generates photoelectric charges corresponding thereto. Furthermore, a reset voltage level is outputted as a unit pixel output signal as follows;

a) In section "B1'", the transfer transistor MT1 is turned off and kept on a turned-off state during a predetermined period in response to the transfer control signal Tx1, while the reset transistor MR1 and the select transistor MS1 are kept on the turned-on state and the turned-off state, respectively;

b) In section "B2", the reset transistor MR1 is turned off in the response to the reset control signal Rx1, while the transfer transistor MT1 and the select transistor MS1 are kept on the turned-off state, to thereby settling the reset voltage level in an output terminal of the unit pixel 100; and c) In section "B3'", the select transistor MS1 is turned on within a predetermined period from turning off of the reset transistor MR1, in response to the select control signal Sx1, while the transfer transistor MT1 and the reset transistor MR1 are kept on the turned-off state, to thereby output the reset voltage level as a unit pixel output signal and simultaneously sampling the reset voltage level by the A/D converter (30, in FIG. 1) (in section B4'). At this time, photoelectric charges are generated in the photodiode 101 during the period of the sections "B1'" to "B3'". In accordance with a preferred embodiment of the present invention, the select transistor MS1 can be preferably turned on at an end of turning-off of the reset transistor MR1 to thereby further reduce the power consumption. Further, the above predetermined period can be determined by considering capacitance between the sensing node N1 and the ground, wherein the capacitance is called as a diffusion capacitance.

Further, in the second unit pixel output mode MODE3', a data voltage level corresponding to the photoelectric charges generated in the photodiode 101 is outputted and sampled as follows:

a) In section "C1'", the transfer transistor MT1 is turned on during a predetermined period in response to the transfer control signal Tx1, while the reset transistor MR1 and the select transistor MS1 are kept on the turned-off state and the turned-on state, respectively, so that the data voltage level is outputted through the drive transistor MD1 and the select transistor MS1 as a unit pixel output signal;

b) In section "C2'", the transfer transistor MT1 is turned off in response to the transfer control signal Tx1 while the reset transistor MR1 and the select transistor MS1 are kept on the turned-off state and the turned-on state, respectively, to thereby settling the data voltage level in the output terminal of the unit pixel 100.

c) In section "C3'", the data voltage level, i.e., the unit pixel output signal, is sampled by the single slope A/D converter (30, in FIG. 1); and d) In section "C4'", the select transistor MS1 is turned off in response to the select control signal Sx1 while the reset transistor MR1 and the transfer transistor MT1 are kept on the turned-off state.

Then, the modes from the MODE1' to MODE3' are repeated for processing next image.

As can be seen from the above, in accordance with the present invention, the selected transistor MS1 can be turned on within a predetermined period (in section "B2'") from the turning-off of the reset transistor MR1 (in the section "B3'"), so that the reset voltage level can be transferred without connection to the voltage source in an effective manner. Therefore, a current path between the voltage source and the ground is prevented, to thereby effectively reduce unnecessary power consumption. Furthermore, it is possible to uniformly supplying a stable power to all of the pixel units, to thereby improving a total picture quality.

Although the preferred embodiments of the invention have been disclosed for illustrative purposes, those skilled in the art will appreciate that various modifications, additions and substitutions are possible, without departing from the scope and spirit of the invention as disclosed in the accompanying claim.

What is claimed is:

1. A method for driving a pixel array including a plurality of unit pixels in an image sensor, wherein each of the unit pixels has a light sensing means for receiving light from an object and for generating photoelectric charges, an amplification means for amplifying an input signal to output an amplified signal, a first switching means for transferring the photoelectric charges from the light sensing means as the input signal to the amplifying means, a second switching means for transferring a reset voltage level from a voltage source to the light sensing means and the amplification means, and a third switching means for outputting the amplified signal and the reset voltage level as unit pixel output signals, the method comprising the steps of:

a) controlling the first switching means, the second switching means and the third switching means to provide the reset voltage level to the light sensing means in order to make a fully depleted region in the light sensing means;

b) after a first predetermined period from the completion of the step a), turning off the second switching means, while the first switching means and the third switching means are kept on a turned-off state; and c) within a second predetermined period from the completion of the step b), turning on the third switching means, while the first switching means and the second switching means are kept on the turned-off state, to thereby output the reset voltage level as a unit pixel output signal.

2. The method as recited in claim 1, further comprising the step of sampling the reset voltage level at the same time when the third switching means is turned on at the step c).

3. The method as recited in claim 1, wherein the step a) includes the steps of:

a1) tuning on the second switching means, while the first switching means and the third switching means are kept on the turned-off state;

a2) tuning on the first switching means and keeping the first switching means on the turned-on state during a third predetermined period to thereby make a fully depleted region in the light sensing means; and a3) turning off the first switching means.

4. The method as recited in claim 1, further comprising the step of:

after a fourth predetermined period from the completion of the step c), turning on and off the first switching means during a predetermined period while the second means is kept on the turned-off state and the third switching means is kept on the turned-on state to thereby output the amplified signal corresponding to the photoelectric charges from the light sensing means as an unit pixel output signal.

5. The method as recited in claim 3, further comprising the step of:

after a fourth predetermined period from the completion of the step c), turning on and off the first switching means during a predetermined period while the second means is kept on the turned-off state and the third switching means is kept on the turned-on state to thereby output the photoelectric charges from the light sensing means as an unit pixel output signal.

6. The method as recited in claim 4, further comprising the step of sampling the amplified signal after a predetermined period from the turning-off of the first switching means.

7. The method as recited in claim 5, further comprising the step of sampling the amplified signal after a predetermined period from the turning-off of the first switching means.

8. The method as recited in claim 5, wherein the first, second, third switching means and the amplification means are NMOS transistors.

9. The method as recited in claim 8, wherein the light sensing means is a photodiode.

10. An image sensor for converting an image into an electrical signal, comprising:

a pixel array including a plurality of unit pixels, arranged in a matrix, wherein each of the unit pixels for generating an amplified signal corresponding to photoelectric charges and a reset voltage level as unit pixel output signals, each of the unit pixels including:

a light sensing means for receiving light from an object and for generating photoelectric charges;

an amplification means for amplifying an input signal to output the amplified signal and the reset voltage signal;

a first switching means, in response to a first control signal, for transferring the photoelectric charges from the light sensing means as the input signal to the amplification means;

a second switching means, in response to a second control signal, for transferring the reset voltage level from the voltage source to the light sensing means and the amplification means; and a third switching means, in response to a third control signal, for outputting the amplified signal and the reset voltage level as unit pixel output signals; and a control means for controlling the pixel array by generating the first, the second and the third control signals in accordance with a control mode, wherein the control mode includes a first unit pixel output control mode and, in the first unit pixel output control mode, the second switching means is turned off in response to the second control signal and the third switching means is turned on in response to the third control signal within a predetermined period after turning-off of the second switching means, while the first switching means is kept on a turned-off state, to thereby output the reset voltage level through the amplification means and the third switching means as a unit pixel output signal.

11. The image sensor as recited in claim 10, further comprising a conversion means for converting the unit pixel output signals into digital signals, wherein in the first unit pixel output control mode, the conversion means performs a sampling of the reset voltage level at the same time when the third switching means is turned on.

12. The image sensor as recited in claim 10, wherein the control mode includes a reset control mode and, in the reset control mode, in response to the second control signal, the second switching means is turned on, while the first switching means and the third switching means are kept on a turned-off state and, in response to the first control signal, the first switching means is turned on and kept on the turned-on state during a second predetermined period and the first switching means is turned off to thereby make a fully depleted region in the light sensing means.

13. The image sensor as recited in claim 10, wherein the control mode includes a second unit pixel output mode and, in the second unit pixel output mode, in response to the first control signal, the first switching means is turned on and off while the second switching means is kept on the turned-off state and the third switching means is kept on the turned-on state to thereby output the amplified signal corresponding to the photoelectric charges from the light sensing means as an unit pixel output signal.

14. The image sensor as recited in claim 12, wherein the control mode includes a second unit pixel output mode and, in the second unit pixel output mode, in response to the first control signal, the first switching means is turned on and off while the second switching means is kept on the turned-off state and the third switching means is kept on the turned-on state to thereby output the amplified signal corresponding to the photoelectric charges from the light sensing means as an unit pixel output signal.

15. The image sensor as recited in claim 13, further comprising a conversion means for converting the unit pixel output signals into digital signals, wherein in the second unit pixel output control mode, the conversion means performs a sampling of the amplified signal at same time when the third switching means is turned on.

16. The image sensor as recited in claim 14, further comprising a conversion means for converting the unit pixel output signals into digital signals, wherein in the second unit pixel output control mode, the conversion means performs a sampling of the amplified signal at same time when the third switching means is turned on.

17. The image sensor as recited in claim 16, wherein the first, second, third switching means and the amplification means are NMOS transistors.

18. The image sensor as recited in claim 17, wherein the light sensing means is a photodiode.

* * * * *